United States Patent [19]

Zoot et al.

[11] 3,762,820
[45] Oct. 2, 1973

[54] SELF-LEVELLING LASER REFERENCE PLANE

[75] Inventors: Robert M. Zoot; Gilbert E. Erb, both of Los Angeles, Calif.

[73] Assignee: Ati, Inc., Los Angeles, Calif.

[22] Filed: Aug. 18, 1970

[21] Appl. No.: 64,732

[52] U.S. Cl. ............................. 356/152, 356/172
[51] Int. Cl. ................................... G01b 11/26
[58] Field of Search................. 356/152, 150, 172; 340/258 B

[56] References Cited
UNITED STATES PATENTS

| | | | |
|---|---|---|---|
| 3,197,643 | 7/1965 | Morris | 356/152 |
| 2,921,496 | 1/1960 | Thurnheer | 350/25 |
| 3,603,688 | 9/1971 | Smith-Vaniz | 356/152 |
| 3,567,326 | 3/1971 | Smith-Vaniz | 356/152 |
| 3,370,285 | 2/1968 | Cruse et al. | 340/258 B |

Primary Examiner—Benjamin A. Borchelt
Assistant Examiner—S. C. Buczinski
Attorney—Henry M. Bissell

[57] ABSTRACT

Apparatus for establishing a horizontal self-correcting plane using light from a laser or other optical source to establish a geometric form whose plane is normal to the gravitational vector. The apparatus maintains the reference plane horizontal, regardless of supporting surface shifts or other displacements.

21 Claims, 6 Drawing Figures

INVENTORS
ROBERT M. ZOOT
GILBERT E. ERB
BY Henry M. Bissell
ATTORNEY

SELF-LEVELLING LASER REFERENCE PLANE

BACKGROUND OF THE INVENTION

1. Field of the Invention

This invention relates to referencing systems, and more particularly to such a system for developing a horizontal reference plane for use in measuring an established geometric form.

2. Description of the Prior Art

Self-levelling laser reference plane systems have been developed utilizing hydrants and structural supports to establish a four-point geometric figure in the form of a rectangle. Hydrants are the monument reference marks that are used to establish the plane. In such a prior art system, a laser was embodied in the first hydrant and the laser beam emitted therefrom passed through each of the next three successive monument hydrants at which the beam was turned through a 90° angle by use of a penta prism. Upon return of the deflected laser beam to its point of origin, it was received by a photocell coupled to a servosystem which established vertical and horizontal directions of the apparatus, thereby maintaining the reference plane truly horizontal. Such prior art systems depended upon maintenance of a closed loop operation of the reference system, requiring that each of the monument hydrants be properly and continuously positioned for the operation of the system.

A metal template was also required for positioning each of the four monuments individually with respect to some outside position center. Such a position center is often located within the periphery of the geometric form configured within the confines of the horizontal reference plane and thus makes measurement therefrom difficult to effectuate. Moreover, each of the individual hydrants required a multiple axis servo device and electronic level sensor for its operation in the system. If one of the monument hydrants is moved for some reason, such as temporary removal to permit some adjustment relative to the geometric form undergoing measurement, the reference plane system is rendered inoperative and, upon restoration of the hydrant, must undergo another set-up procedure before the system can be operated effectively.

SUMMARY OF THE INVENTION

In brief, particular arrangements in accordance with the present invention provide a self-levelling reference system which is not subject to the limitations mentioned above with respect to prior art systems by virtue of the fact that individual lasers with automatic laser beam self-levelling units are provided in each of the hydrants employed as monuments in defining the reference plane. In this system, therefore, there is no need for electronic servo apparatus which prior art systems require to maintain the horizontal reference position. The self-levelling units provide automatic self-levelling of the laser beam on a passive basis through the use of apparatus which is effective in response to the force of gravity and its effect on an included fluid-wedge beam-deflecting device which automatically corrects for beam deviation from a truly vertical path, as defined by the gravitational force vector.

For specific details of the laser beam self-levelling mechanism employed herein, reference is made to Application Ser. No. 21,773 filed Mar. 23, 1970, for LASER BEAM PLANAR REFERENCE, of Robert M. Zoot, assigned to the assignee of this application. For the purpose of understanding the present mechanism, it will suffice to describe the beam levelling mechanism as involving two glass-bottomed containers of fluid, through which the laser beam is projected vertically in succession. The fluid is selected to have an index of refraction substantially identical to that of the glass forming the bottom of each container. As the beam deviates from the true vertical direction by a small angle, the fluid flows in response to gravitational force and develops a wedge with the surface of the glass bottom, which wedge has an angle equal to the angle of deviation of the beam device from the vertical. As is well known in the field of optics, for small angles of deviation of the beam such a wedge provides a deflection of the beam passed therethrough by one-half the angle of the wedge. As a result, by virtue of passing the beam through two such wedges in succession, the self-levelling mechanism restores the beam to a truly vertical path. Suitable lenses and prisms are included for deflecting the beam to a truly horizontal position, or to a direction at any angle which is desired relative to the true vertical reference established by the self-levelling mechanism.

Particular arrangements in accordance with the present invention employ monument hydrants which are identical in construction. Each of the individual hydrants employed herein comprises a beam self-leveller, as already described, together with side-mounted photodetectors and autocollimation photodetectors for establishing a desired interlocking relationship with the other hydrants in the system. Angular position information developed from the self-levelling device in an individual hydrant is realized through the autocollimation interlocks between the respective hydrant stations, thus allowing any individual one of the hydrants to be removed from the system and to be replaced with a reference corner extender, to be described hereinbelow. Through the use of such a reference corner extender in accordance with an apsect of the invention, the closed loop or autocollimation interlock of the entire reference system is maintained while permitting the removal of one of the reference corner hydrants.

In a preferred embodiment, the reference system utilizes four identical hydrants. There is no "master" hydrant as such, that hydrant which is placed in position number "one" being the master or basic reference of the four. This particular arrangement allows for the intermixing of the hydrants with no preference being required as to set-up order or placement. Moreover, the hydrants need not be maintained as a set but may be intermixed freely with others of the same type to establish a reference coordinate system.

In accordance with the invention, each individual hydrant may comprise a hydrant table with an optical locating device and adjustable levelling screws for establishing a horizontal, level reference plane to a first order of precision. Once the first order of precision is established on the reference table by the use of ordinary levelling devices, such as a bubble-type level, the automatic levelling mechanism of the laser beam self-leveller included in the hydrant takes over and establishes the true horizontal direction for the laser beam.

Each hydrant preferably includes a mirror and a photodetector in the form of a light-responsive film divided into four equal areas with associated electrical connections for providing a response indicative of the position of the beam incident thereon relative to the center of the photodetector. The mirror employed is of the partially reflecting or beam-splitting type and is set in position during fabrication of the hydrant so that it is accurately perpendicular to the laser beam. Also, during manufacture of the hydrant, the photodetector used with the beam-splitting mirror is aligned in vertical height with the laser beam.

The photodetectors employed in hydrants in accordance with the invention may be either bicells or quadcells, as are known in the art, and are devices for the accurate determination of the position of an incident light beam. In such a device, a circular planar surface is divided into either two (bicell) or four (quadcell) equal segments, each segment having a photosensitive coating which generates a signal proportional to the amount of light striking the segment. When an incident light beam is centered on the circular area, diametrically opposed cell segments produce equal output electrical signals. These devices are used herein for nulling operation only.

In use, referencing of the hydrant in the number "one" position relative to the location of the geometric form with respect to which the reference plane is to be established may be accomplished in any suitable manner. For example, a steel template bar may be employed to determine the position of the first hydrant, or other forms of locating fixtures or previously "shot in" benchmarks established through the use of common optical alignment instruments may be employed. A locating eye piece affixed to the hydrant platform may be used to help align the hydrant position with the reference benchmarks or other locating points. When the position of the first hydrant is accurately established, the second hydrant is placed in position by reference to an X-axis benchmark on the aligning fixture or to some other reference point and by using the beam from the number "one" hydrant for Y and Z positions. (X and Y directions are defined as being the orthogonal coordinates in the vertical plane intersecting the first and second hydrants. The Z-axis direction is the coordinate orthogonal to that plane). The third hydrant is located using the laser beam from the second hydrant for height and angular position, and a measuring bar or tape for Z-axis position. The fourth hydrant is located entirely by reliance on the laser beam from the third hydrant plus closing the optical loop on the quadcell and mirror located on the first hydrant. When in place in the system, each hydrant is optically coupled to both adjacent hydrants by virtue of its own beam detectors and associated null indicators.

According to one aspect of the invention, systems in accordance herewith permit the removal of one of the monument hydrants from its normal location and the maintenance of the reference horizontal plane by the use of the so-called corner extender. This is an instrument which comprises a quadcell and a beam-splitting mirror mounted in a stand capable of being located accurately along the vertical and horizontal axes transverse to the laser beam of an adjacent hydrant. Electrical signals developed by the quadcell are transmitted to the hydrant which is moved from its normal position in the rectangle of the reference system to a position in line with the next hydrant. Thus, the beam loop is maintained, even though one of the hydrants is removed from its normal position within the reference planar beam rectangle.

If the period of time during which one of the hydrants is to be removed from its normal position is not too long, the equipment may be operated in the open loop mode with reasonable assurance that the accuracy be maintained because of the use of automatic beam levelling techniques in each of the remaining hydrants. If, however, the work with the system is to be continued for an extended period while the hydrant is removed from its normal position, it becomes necessary to relocate the removed hydrant in such a manner as to close the loop of the reference system and to supply the necessary reference beam for work at other positions on the reference system. The steps to set up the second hydrant in a new reference position removed from its normal position within the reference planar beam rectangle involves initially positioning the corner extender directly in front of the laser beam output of the second hydrant. That is, the corner extender is adjacent hydrant number "two" on the hydrant "three" side and facing the laser beam output. The corner extender device is then centered relative to the laser beam output of hydrant number "two" so that it becomes accurately aligned along the laser beam between hydrants two and three. Hydrant two may now be moved some convenient distance out of the reference rectangle and realigned with the corner extender and the hydrant number "three". The reference line between hydrants two and three is thus reestablished but with an extended distance between the two hydrants. The extender device may now be removed from its original position and repositioned outside the reference rectangle but along the line of the laser beam output from hydrant number "one." The corner extender device thus takes the place of the receiver cell on hydrant number two with respect to responding to the laser beam output from hydrant number one and establishes the base reference line for continued use of hydrant number one. Electrical connections between the corner extender device and hydrant number two serve to maintain the closed servo loop.

In addition to utilization of a corner extender in the manner described to permit relocation of one of the hydrants from the normal corner position within the reference planar beam rectangle, it should be mentioned that vertical position, as separate from angular vertical position, may be established at any of the hydrants and quadcells, including the corner extender, through the use of vertical access servo devices, in accordance with a further aspect of the invention. These are direct vertical motion servos acting against the floor to raise or lower the entire hydrant, and may be employed if a vertical position is to be established exterior to the reference system itself. By the use of such servos and transfer electronics, vertical position reference with respect to the floor may also be established.

Although systems and devices in accordance with the invention are described herein in the context of a laser beam reference system, it should be understood that such systems and devices are not limited to the use of such a beam, but may be operated in conjunction with any optical beam. Moreover, although the principles of the invention are disclosed herein in the context of the preferred embodiment which utilizes four hydrants in a rectangular plane layout, it will be understood that other layouts may be utilized in accordance with the invention. For example, three hydrants employed in a triangular pattern to develop a self-levelling plane may utilize beam receivers oriented at appropriate angles, such as 120°, to the associated beam sources to develop the desired beam paths. Two hydrants may be used, if desired, to provide controlled level orientation of a single beam. Accordingly, therefore, the scope of the present invention as defined in the claims appended hereto will be taken to extend to any optical system utilizing the principles of the present invention.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
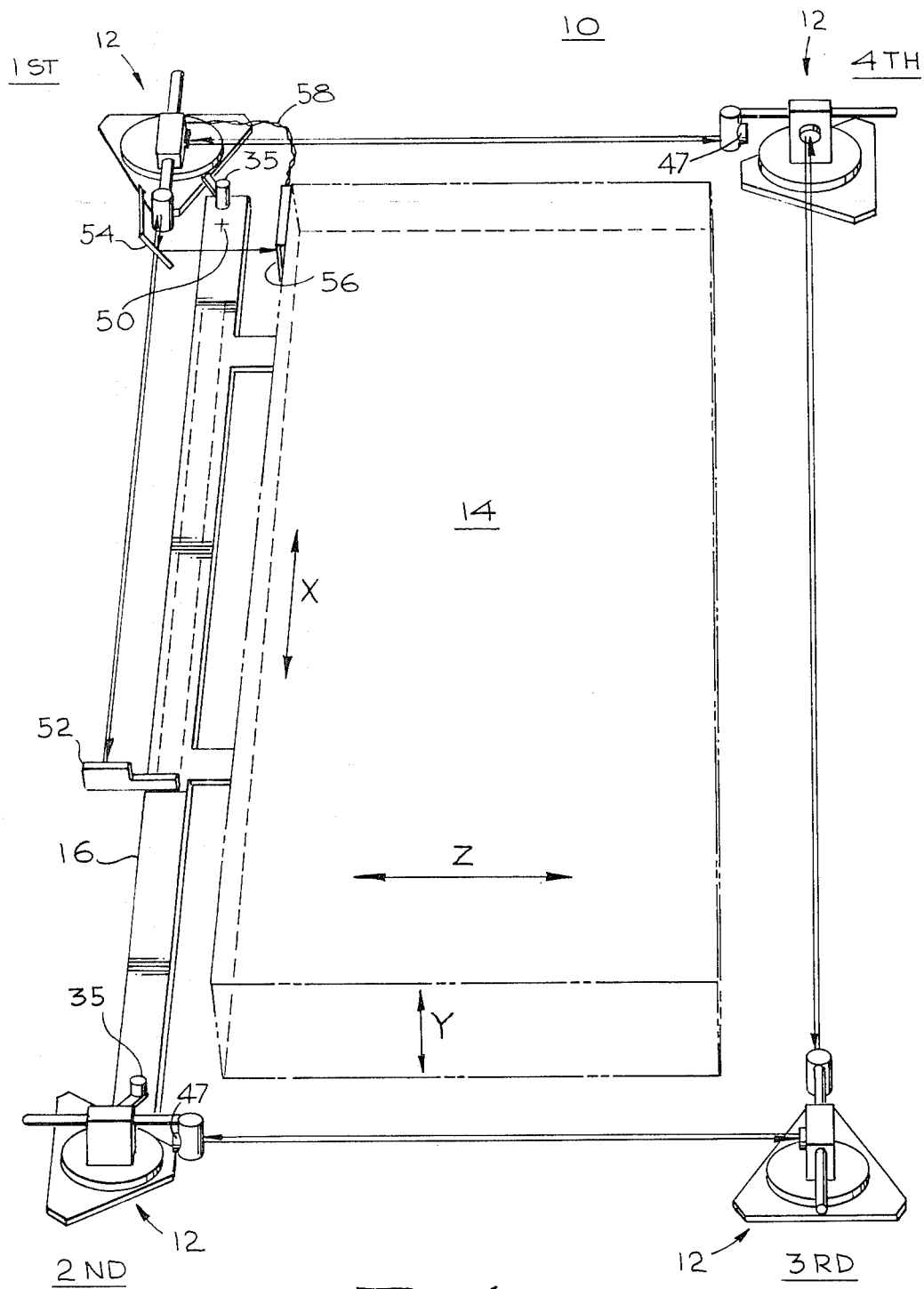
FIG. 1 is a partially schematic representation of one particular arrangement of a system in accordance with the invention.

As shown in FIG. 1, one particular system 10 in accordance with the invention includes four separate hydrants 12 arranged in a rectangle to establish a reference plane as the basis for measurement of the dimensions of some article which may be placed on a platform 14, referred to as an armature. Also shown in FIG. 1 is a locating fixture 16 which may be used in initial positioning of the hydrants 12 in order to set up the reference plane.

Figure 2:
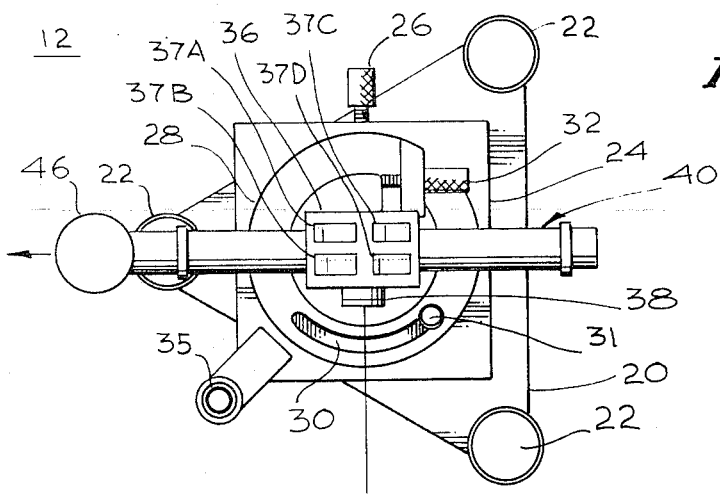
FIG. 2 is a plan view of apparatus which may be employed in the arrangement of FIG. 1.
Figure 3:
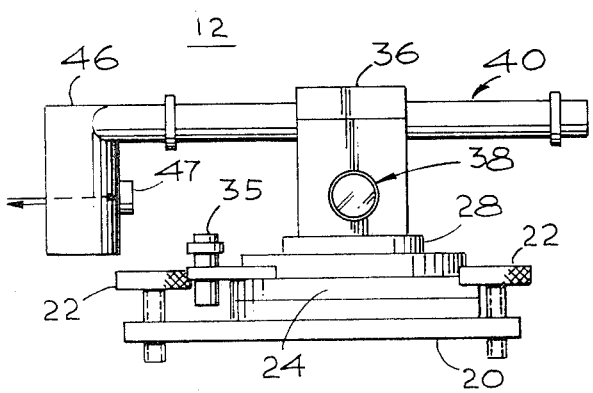
FIG. 3 is a side elevation of the apparatus of FIG. 2.
Figure 4:
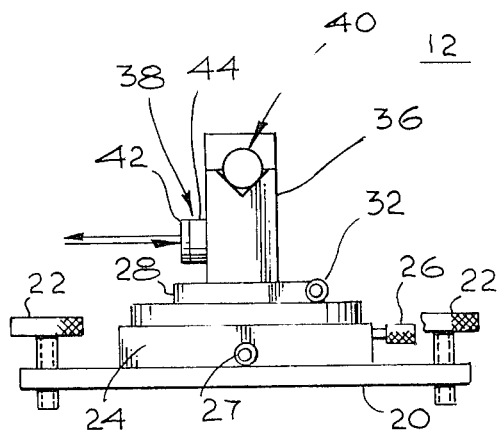
FIG. 4 is a front elevation of the apparatus of FIG. 2.

The details of a hydrant 12 are shown in FIGS. 2, 3 and 4, which display plan, side elevation and front elevation views respectively of the hydrant 12. As shown in these views, the hydrant 12 may be seen to comprise a base 20, triangular in outline, and having three adjustable levelling screws 22 at its respective corners. An "X-Y" table 24 is supported on the base 20 by means which permit lateral position adjustment. This is controlled by adjusting screws 26 and 27. A rotary table or platform 28 is mounted on the X-Y table 24 by means which permit controlled rotation through approximately 90° of freedom. Position of the rotary table 28 is controlled by the arcuate slot 30, a clamping screw 31, and a tangent screw adjustment mechanism 32. A locating eye-piece 35 is affixed to the X-Y table 24. Mounted on top of the rotary table 28 is a support tower 36 which contains an optical beam receiver 38 and an optical beam source 40. As shown, the optical beam receiver 38 comprises a beam splitter 42 and a quadcell 44. In this arrangement, the optical beam source 40 preferably comprises a gaseous laser and includes a beam-directing device 46 in the form of a laser beam leveller. A second quadcell 47 is mounted on the device 46.

The beam splitter 42 is in the form of a thin glass plate with a semi-reflective coating on one side. Part of the incident beam passes through the beam splitter 42 to the quadcell 44, and part is reflected back along the beam path to the quadcell 47 of the preceding hydrant.

During the fabrication of the hydrant 12, the mirror 42 is set precisely perpendicular to the laser beam from the beam source 40 and the quadcell 44 is aligned in vertical height with the beam and is positioned precisely with respect to the reference marks on the hydrant platform 20 which may be used in the measurement of the distance to the next hydrant. The quadcell 47 is associated with a lens system which receives the portion of the beam reflected from the beam splitter 42 of the succeeding hydrant 12 and passes it through a double Pechan prism (to accommodate the required focal length in a compact structure) to focus on the quadcell 47. Since the quadcell 47 is located at the focal point of the lens system, it is only sensitive to incident beam angle. Therefore, the output of the quadcell 47 is used to determine azimuth and elevation angle of the hydrant relative to the beam.

In practice, four of the hydrants 12 of FIGS. 2–4 are used in the system 10 shown in FIG. 1 to establish a reference plane fixed in space. A particular example of the application of such a system is in an automotive company styling studio, where the four hydrants 12 are used to establish a coordinate reference plane surrounding a clay model in the form of a design prototype from which design and body data must be taken. The establishment initially of the horizontal reference plane provides the equivalent of a free-floating stable platform in space.

The clay model is customarily positioned on the platform or armature 14 which establishes the base reference or datum line from which dimensions are taken in the setting up or initial positioning of the hydrants 12. As indicated in FIG. 1, a locating fixture is used to position the first and second hydrants 12 on the left-hand side of FIG. 1. As shown, the fixture 16 is a template which rests on the floor and may be positioned precisely with respect to the armature 14. Although not shown, it will be understood that the dimensions of the fixture 16 may be variable or different fixtures may be employed in place of that shown in order to develop varying dimensions for the hydrants 12 with respect to the armature 14. The fixture 16 is provided with benchmarks such as 50 from which sights are taken through the optical locating eyepiece 35 to develop the initial position of the first and second hydrants 12. A pivot arm 52 is shown extending from the fixture 16 and contains a bubble level and a bicell for angular alignment of the laser beam from the first hydrant 12. Levelling of the pivot arm 52 in the roll plane is necessary in order to obtain an accurate measurement of the horizontal distance from armature 14 to the line of sight of the laser beam from the first hydrant 12. Levelling of the position of the fixture 16 is considered unnecessary because the reference marks such as 50 are very close to the floor, and horizontal errors from the out-of-level position are very minor. When the first hydrant 12 is aligned with the reference mark 50, the laser beam splits the bi-cell of the pivot arm 52 evenly. A beam splitter device 54 in the form of a semi-reflective coating on one surface of a thin glass plate diverts a portion of the beam from the first hydrant 12 at right angles to a bicell 56 which is fastened at a reference point on the armature 14. The bicell 56 is connected by means of wires 58 to the first hydrant 12 so as to provide an indication when the alignment of the first hydrant 12 is completed.

Following the positioning of the first hydrant 12 as described, the beam splitter 54 and the pivot arm 52 are removed or moved out of the way of the laser beam from the first hydrant 12. The second hydrant 12 is located initially by use of the optical sighting device 35 with reference to a locating point such as 50 on the adjacent end of the fixture 16. This develops an X-axis reference location for the second hydrant 12 and the laser beam from the first hydrant 12 is employed for determining the Y and Z positions of the second hydrant.

The third hydrant 12 is located by using the laser beam from the second hydrant 12 for height and azimuth position, and by employing a measuring bar or tape for the Z axis position (the distance from the second hydrant 12). The fourth hydrant 12 is located entirely by using the laser beam from the third hydrant 12 plus closing the optical loop on the beam receiver 38 in the first hydrant 12.

Each of the hydrants 12 is provided with null indicators 37A, 37B, 37C and 37D for providing indications of horizontal and vertical orientation and azimuth and elevation angles respectively. The horizontal and vertical orientation indications are developed from corresponding vertically and horizontally oriented pairs of segments in the quadcell 44 in the beam receiver 38. The azimuth and elevation indications are derived from the quadcell 47 mounted in the beam leveller device 46.

Figure 5:
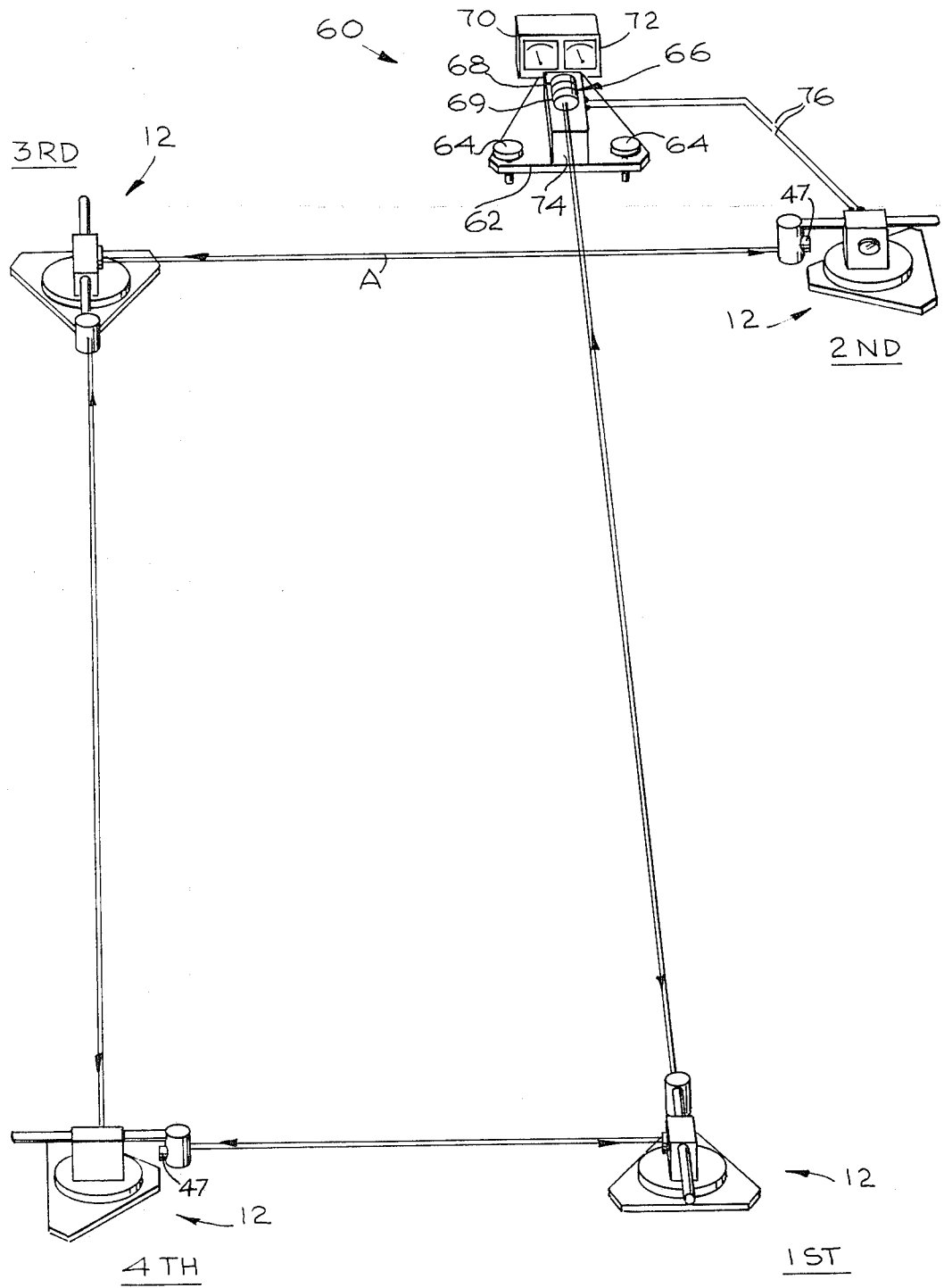
FIG. 5 is another particular arrangement of a system in accordance with the invention incorporating a variation of the system of FIG. 1.

FIG. 5 illustrates another particular arrangement in accordance with the present invention involving a variation of the systems shown in FIG. 1. Only the hydrants 12 are shown in FIG. 5, the locating fixture 16 and the armature 14 being omitted for simplicity. The arrangement of FIG. 5 provides for the removal of a particular one of the hydrants 12 from its normal corner position while continuing to maintain the reference plane established by the hydrants 12 by means of apparatus which continues the laser beam loop about the hydrant rectangle.

This apparatus comprises a corner extender 60 which, in the example shown in FIG. 5, is used in conjunction with the second hydrant 12, with the second hydrant 12 removed from its normal corner position. Of course, if the system is to be in use for only a relatively short period with one of the hydrants removed from its corner position, there is no need for setting up the system of FIG. 5 because the automatic levelling techniques provided by the beam levellers 46 in the respective hydrants 12 maintain the desired accuracy of the reference plane, even though the system would be in an open loop mode. However where the hydrant 12 is to be removed from the corner position for an extended period of time, the corner extender 60 may be utilized in conjunction with the displaced hydrant so as to maintain the closed loop mode of operation.

Relocation of a particular corner hydrant from its normal position and continued maintenance of the closed loop mode of operation for the self-levelling reference plane with the use of the corner extender may be effected by a practice of the following procedure. The corner extender 60 is similar in construction to one of the hydrants 12 except that it is a passive beam receiver and does not have a beam source. In essence, it comprises a platform or base 62 with adjustable vertical support legs 64 and a beam receiver 66 comprising a quadcell 68 and a beam splitting mirror 69. Vertical and horizontal readout indicators 70 and 72 are coupled to the output of respective vertical and horizontal pairs of the quadcell 68 so as to provide an indication to an operator of alignment of the instrument with the incident beam from the preceding hydrant 12. For purposes of illustration, let it be assumed that the second hydrant 12 is the one which is to be displaced from its normal corner location and thus that the incident beam directed to the beam receiver 66 of the corner extender 60 derives from the beam source in the first hydrant 12.

In preparation for relocating the second hydrant 12, a reference line must be established along which the second hydrant 12 may be moved and relocated. For this purpose, the corner extender 60 is initially placed directly in front of the laser beam output of the second hydrant, as at point A. The corner extender 60 positioned at the point A is then centered to the laser beam from the second hydrant 12. The second hydrant 12 is now moved some convenient distance out of the system by any number of feet within the limits of the use of the beam and placed on the floor. It is adjusted so that its beam passes through the center of the quadcell 68 to impinge on the quadcell 44 of the third hydrant 12. The desired reference line is thus established as indicated in FIG. 5 between the second and third hydrants 12. The corner extender 60 is now removed from the position A to the position as shown in FIG. 5 such that the laser output from the first hydrant 12 now subtends the center of the quadcell 68. The beam receiver 66 of the corner extender 60 takes the place of the receiver cell on the second hydrant 12 and maintains the base reference line as shown extending between the first hydrant 12 and the corner extender 60 for continued use of the first hydrant 12. The operating loop is now closed, because any displacement of any hydrant in the system will be detected by an appropriate beam receiver quadcell with electrical signals developed by the quadcell 68 transmitted to the second hydrant 12 via electrical connections 76. If vertical position control of the reference plane established by the hydrants is desired, the beam receiver 60 may include a vertical axis servo device 74, in which case the electrical connections 76 are provided between the second hydrant 12 and the corner extender 60 for operation of the vertical servo 74.

Figure 6:
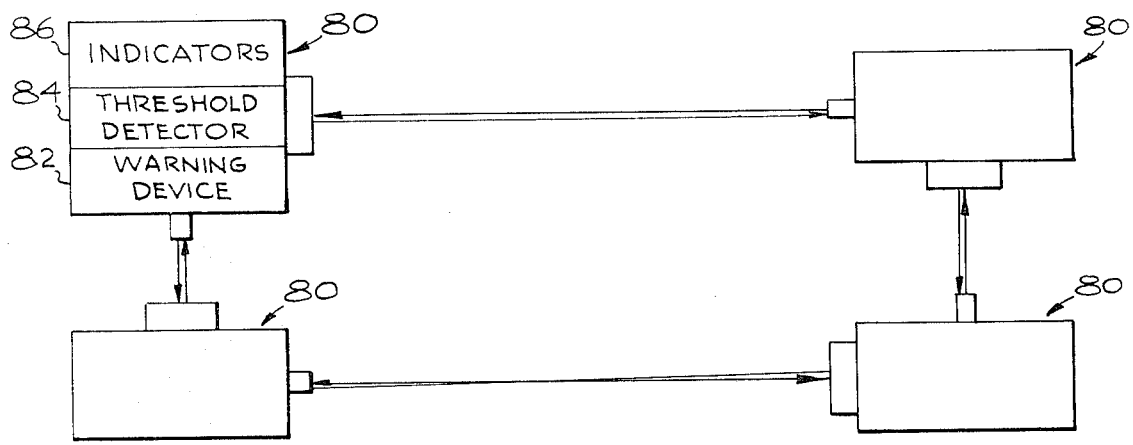
FIG. 6 is a block diagram of another system of the invention similar to the arrangement of FIG. 1.

FIG. 6 illustrates in block diagram form another particular arrangement in accordance with the invention comprising a plurality of hydrant apparatus 80 similar to the hydrants 12 of FIGS. 1–5, except that the hydrants are provided with warning devices 82 and a threshold detector 84 in addition to the indicators 86 for providing vertical, horizontal, azimuth and elevation readout. In the system of FIG. 6, once the reference plane is established by use of the indicators 86 and in the manner already described in setting up the system of FIG. 1, a switch (not shown) in each hydrant 80 is activated to complete the circuit between the threshold detector 84 and the warning device 82. The warning device 82 may be a buzzer, bell, light, or any similar mechanism for providing a warning which may attract the attention of an operator. It may even comprise a radio transmitter for transmitting a warning signal to some remote location. The warning device 82 will be quiescent so long as the respective beams are directed within a predetermined range of the null position initially established by resort to the indicators 86. However, when that range is exceeded, the threshold detector 84 energizes the warning device 82 to attract the attention of the operator and indicate that the system has deviated off limits. By use of a system of this type, the reference plane arrangement may be left unattended, once it has been set up in closed loop operation, until a warning is noted as an indication that the system needs adjustment to bring it within limits.

Although there have been described above specific arrangements of a self-levelling laser reference plane and methods of operation thereof in accordance with the invention for the purpose of illustrating the manner in which the invention may be used to advantage, it will be appreciated that the invention is not limited thereto. Accordingly, any and all modifications, variations or equivalent arrangements which fall within the scope of the annexed claims, should be considered to be a part of the invention.

What is claimed is:

1. A system for establishing and maintaining a self-levelling reference plane comprising:
   a plurality of spaced oriented individual reference devices aligned at corners of a geometrical pattern in a reference plane;
   each of said devices having a beam source and a beam receiver oriented at an angle to each other defined by the angle of the corner in which said device is disposed, such that said beam source is aligned along one boundary defining said corner and said beam receiver is aligned along the other of said boundaries defining said corner;
   each said device also including means responsive to the beam receiver for providing an indication of the orientation of a beam received from a next adjacent device in said system and means positioned in the path of a beam from said beam source for automatically maintaining the beam from said source in a level attitude.

2. A system in accordance with claim 1 wherein said beam levelling means comprises gravity responsive means for controlling the direction of the beam therethrough in accordance with the deviation of a selected portion of said means from a true vertical orientation.

3. A system in accordance with claim 1 wherein said beam receiver comprises a beam splitter and a photoresponsive quadcell for developing comparison signals corresponding to the deviation of the received beam from the center of the quadcell.

4. A system in accordance with claim 3 wherein said quadcell comprises a horizontally-disposed pair of photo-conductive segments and a vertically-disposed pair of photo-conductive segments, and further including a vertical indicator coupled to said vertically-disposed pair and a horizontal indicator coupled to said horizontally-disposed pair for indicating the position of the beam relative to the center of the quadcell.

5. A system in accordance with claim 3 wherein each device further includes another photoresponsive element positioned to receive a reflected beam from the beam splitter of an adjacent device for developing signals indicative of the angle of said reflected beam.

6. A system in accordance with claim 5 further including indicators coupled to said photoresponsive element for providing indications of azimuth and elevation angles respectively.

7. A system for establishing a self-levelling reference plane comprising:
   a plurality of individual devices positioned respectively at corner positions in said plane;
   each of said devices including a beam source and means at right angles to the beam from said source for receiving a beam directed from an adjacent one of said devices;
   means for locating the first of said devices at a particular position and orientation relative to a reference object;
   means for locating a second of said devices at a particular position and orientation relative to said object and said first device;
   means for locating a third of said devices at a particular distance and orientation relative to said second device; and
   means for locating the fourth of said devices at a particular position and orientation relative to said third and first devices.

8. A system in accordance with claim 7 wherein all of said devices are substantially alike in construction and function such that they may be intermixed with respect to the various positions in the system.

9. A system in accordance with claim 7 further including a corner extender device having a beam receiver with indicating means coupled thereto for permitting the relocation of one of said first-mentioned devices along a first reference line extending past the original corner location of said device, and for establishing a second reference line along the path of the beam incident on said relocated device when said relocated device was in its initial corner location.

10. A system in accordance with claim 7 further including vertical position servo means for automatically adjusting the elevation of said devices and the associated self-levelling reference plane established thereby.

11. A system in accordance with claim 7 further including means for developing a warning signal upon detection of a deviation of any one of said beams from a predetermined position by an amount in excess of a preselected limit.

12. The method of maintaining a self-levelling reference plane established by a plurality of beam devices, each of said devices including a beam source and a beam detector disposed at a predetermined angle to each other, while removing one of said devices from its corner position defined as the point of intersection of its own beam which is directed towards a succeeding adjacent beam device and the beam of the preceding adjacent beam device, said method comprising the steps of:
   positioning a beam-receiving corner extender in the beam path of the beam device to be displaced;
   removing the beam device to be displaced from its corner position along a first reference line defined by said corner extender and the succeeding adjacent beam device until the desired clearance is developed at said corner position;
   bringing said corner extender to a second position along a reference line defined by the beam path of the preceding adjacent beam device; and
   operating said corner extender to maintain said reference line as a part of the reference plane defined by the aligned beams of said plurality of beam devices.

13. Apparatus for use in developing and maintaining a portable self-levelling reference plane comprising a beam source and a beam receiver having central longitudinal axes fixed at a predetermined right angle to each other, and beam levelling means positioned to transmit a beam from said beam source after correcting any deviation thereof from a level orientation.

14. Apparatus in accordance with claim 13 further including a base platform and means for levelling said platform.

15. Apparatus in accordance with claim 14 further including a table mounted on said platform and means for adjusting the position of said table relative to said platform in two orthogonal directions.

16. Apparatus in accordance with claim 15 further including means for mounting said beam source and beam receiver on said table, said last-mentioned means including angular adjusting means for controlling the angular direction of the beam from the beam source relative to said table.

17. Apparatus in accordance with claim 13 further including indicating means coupled to said beam receiver for providing an indication of the location of an incident beam relative to said receiver.

18. Apparatus in accordance with claim 16 wherein said beam receiver comprises a photoresponsive quad-cell having a first pair of horizontally-disposed segments and a second pair of vertically-disposed segments, said indicating means including a horizontal indicator coupled to the output of said first pair of segments and a vertical indicator coupled to the output of the second pair of segments.

19. Apparatus in accordance with claim 13 wherein said beam receiver comprises a beam splitter for reflecting a portion of an incident beam back toward the source of the beam.

20. Apparatus in accordance with claim 13 further including a second beam receiver and second indicating means for providing an indication of the angle of a beam incident on said second beam receiver.

21. Apparatus in accordance with claim 20 wherein said second indicating means provides indications of azimuth and elevation angle respectively.

* * * * *